United States Patent
Forejt et al.

(10) Patent No.: US 9,873,310 B2
(45) Date of Patent: Jan. 23, 2018

(54) AIR FILTRATION SYSTEM AND METHOD FOR A HVAC UNIT IN A TRANSPORT COMPARTMENT

(71) Applicant: THERMO KING CORPORATION, Minneapolis, MN (US)

(72) Inventors: Lubos Forejt, Statenice (CZ); Radim Cermak, Prague (CZ)

(73) Assignee: THERMO KING CORPORATION, Minneapolis, MN (US)

(*) Notice: Subject to any disclaimer, the term of this patent is extended or adjusted under 35 U.S.C. 154(b) by 371 days.

(21) Appl. No.: 14/430,073

(22) PCT Filed: Sep. 20, 2013

(86) PCT No.: PCT/US2013/060931
§ 371 (c)(1),
(2) Date: Mar. 20, 2015

(87) PCT Pub. No.: WO2014/047445
PCT Pub. Date: Mar. 27, 2014

(65) Prior Publication Data
US 2015/0246595 A1    Sep. 3, 2015

Related U.S. Application Data

(60) Provisional application No. 61/703,551, filed on Sep. 20, 2012.

(51) Int. Cl.
*B01D 53/02* (2006.01)
*B60H 3/06* (2006.01)
(Continued)

(52) U.S. Cl.
CPC ............ *B60H 3/0658* (2013.01); *B03C 3/011* (2013.01); *B03C 3/025* (2013.01); *B03C 3/09* (2013.01);
(Continued)

(58) Field of Classification Search
CPC ..... B03C 2201/04; B03C 3/011; B03C 3/025; B03C 3/09; B03C 3/12; B03C 3/155;
(Continued)

(56) References Cited

U.S. PATENT DOCUMENTS 3,626,669 A  12/1971 Cardiff
3,988,131 A  10/1976 Kanazawa et al.
(Continued)

FOREIGN PATENT DOCUMENTS

| JP | 11207207 | 8/1999 |
| JP | 3440403 | 6/2003 |
| KR | 100688945 B1 | 3/2007 |

OTHER PUBLICATIONS

Translation of JP3440403, Aug. 2003.*
(Continued)

*Primary Examiner* — Christopher P Jones
(74) *Attorney, Agent, or Firm* — Hamre, Schumann, Mueller & Larson, P.C.

(57) ABSTRACT

Air filtration systems and methods for HVAC units in transport compartments are provided. The air filtration systems and methods described herein use electrostatic forces to capture airborne particles and include a modular design so as to be configured to the space requirements of the transport compartment and reduce air flow resistance. The air filtration system includes one or more modular filtration units. Each of the modular filtration units includes a pre-filter section, an ionizing section and a collecting section.

19 Claims, 11 Drawing Sheets

(51) Int. Cl.
*B03C 3/011* (2006.01)
*B03C 3/09* (2006.01)
*B03C 3/12* (2006.01)
*B03C 3/155* (2006.01)
*B60H 3/00* (2006.01)
*B03C 3/02* (2006.01)
*B03C 3/41* (2006.01)
*B03C 3/47* (2006.01)
*B03C 3/82* (2006.01)

(52) U.S. Cl.
CPC .............. *B03C 3/12* (2013.01); *B03C 3/155* (2013.01); *B03C 3/41* (2013.01); *B03C 3/47* (2013.01); *B03C 3/82* (2013.01); *B60H 3/0071* (2013.01); *B60H 3/06* (2013.01); *B03C 2201/04* (2013.01)

(58) Field of Classification Search
CPC .... B03C 3/41; B03C 3/47; B03C 3/82; B60H 3/0071; B60H 3/06; B60H 3/0658
See application file for complete search history.

(56) References Cited

U.S. PATENT DOCUMENTS

| | | | |
|---|---|---|---|
| 4,133,653 A * | 1/1979 | Soltis | B03C 3/155 96/58 |
| 4,450,900 A | 5/1984 | Nathan | |
| 5,123,944 A * | 6/1992 | Cooper | B01D 46/2407 55/304 |
| 5,290,343 A | 3/1994 | Morita et al. | |
| 5,330,559 A | 7/1994 | Cheney et al. | |
| 5,433,772 A | 7/1995 | Sikora | |
| 6,576,046 B2 | 6/2003 | Pruette et al. | |
| 6,602,330 B2 | 8/2003 | Allen | |
| 7,549,598 B2 | 6/2009 | Tepper et al. | |
| 2002/0069760 A1* | 6/2002 | Pruette | B03C 3/025 96/70 |
| 2004/0118285 A1 | 6/2004 | Kim et al. | |
| 2009/0025402 A1 | 1/2009 | Mello et al. | |
| 2010/0139306 A1 | 6/2010 | Krenik | |
| 2011/0168463 A1 | 7/2011 | Perkins et al. | |
| 2011/0171090 A1 | 7/2011 | Johnson et al. | |
| 2011/0308386 A1 | 12/2011 | Claracq et al. | |
| 2012/0212876 A1 | 8/2012 | Rais et al. | |
| 2012/0222559 A1 | 9/2012 | Sluis | |

OTHER PUBLICATIONS

Supplementary European Search Report issued in corresponding European Application No. 13838862.4 dated May 20, 2016 (11 pages).
International Search Report issued in International Application No. PCT/US2013/060931 dated Dec. 16, 2013 (3 pages).
Written Opinion issued in International Application No. PCT/US2013/060931 dated Dec. 16, 2013 (8 pages).
"Ventilation, Air Handling, Filtration"; DENCOHAPPEL, 2015, http://www.gea-airtreatment.com/GEA-Piccotron.354.0.html?&MP=354-6236.
"CleanEffects™"; Air Cleaner, Trane, Ingersoll Rand, 2014, https://www.trane.com/residential/en/products/add-on-components/air-quality/cleaneffects.html.
"Electronic Air Cleaner (F300)"; Air Clearners, Honeywell, 2016, http://yourhome.honeywell.com/home/Products/Air+Cleaning/Whole-House+Electronic/F300.htm.
European Office Action issued in corresponding European Application No. 13838862.4 dated Jun. 21, 2017 (9 pages).

* cited by examiner

AIR FILTRATION SYSTEM AND METHOD FOR A HVAC UNIT IN A TRANSPORT COMPARTMENT

The embodiments disclosed herein relate generally to a heating, ventilation and air conditioning (HVAC) unit in a transport compartment. More particularly, the embodiments relate to an air filtration system and method for a HVAC unit in a transport compartment.

BACKGROUND

Currently, filtration of air in transport compartments (e.g., bus and/or rail vehicles, etc.) is typically performed by fiber filters or rubber foam mats. Airborne particles are gradually captured from air flow within such filters, thus closing the tiny gaps between the filter fibers. In vehicles, the space available for installation of air filters can be limited, there may be high air flow rates, and may encounter small static pressure. These factors may limit the use of air filters to coarse filters and may prevent the application of filters otherwise used in buildings (e.g. bag filters having a larger size and higher air flow resistance).

Furthermore, maintenance service of these conventional air filters is typically required periodically, for example, at least four times a year. Such maintenance procedures require a skilled workforce and require that the vehicle be out of duty, thus increasing the cost for maintenance.

SUMMARY

The embodiments disclosed herein relate generally to a HVAC unit in a transport compartment. More particularly, the embodiments relate to an air filtration system and method for a HVAC unit in a transport compartment.

The embodiments described herein provide an air filtration system and method for a HVAC unit in a transport compartment that uses electrostatic forces to remove particles. Also, embodiments of the air filtration system and method for a HVAC unit in a transport compartment described herein uses a modular design to allow multiple HVAC units to fit within tight space constraints of a transport compartment and to reduce air flow resistance. Further, embodiments of the air filtration system and method for a HVAC unit in a transport compartment described herein is configured to lower the speed in which an air filter is clogged, thereby increasing the time interval between maintenance procedures. Moreover, unlike traditional fiber filters, the embodiments described herein leave ~100 times larger spacing between the closest surfaces and uses electric forces. Thus, unlike traditional air filtration systems for transport compartments, more airborne particles can be captured before a service of the filtration system is required.

Transport compartments, as described herein, refer to bus or rail compartments, air distribution systems of a vehicle (for example, in a ductwork connecting a return air grill in a passenger compartment with an air-conditioning unit suction port), etc.

In some embodiments, the air filtration system (a.k.a. electrostatic precipitator) includes a frame made of an insulating material (e.g., plastic) for providing structural support and electric insulating functionality to the frame.

In some embodiments, the air filtration system also includes an ionizing wire and holder composed of a single wire intertwined throughout the air filtration system.

In some embodiments, spacing between electrodes of the air filtration system is achieved by carving adjacent structural parts.

In some embodiments, the air filtration system includes a plurality of modular filtration units that can be interconnected by being placed adjacent to each other, or on top of each other.

In some embodiments, each of the modular filtration units includes a pre-filter section, an ionizing section, and a collecting section.

In some embodiments, the pre-filter section of the air filtration system uses a mesh configuration with holes that are sized between ~50% to ~100% of the smallest electrode spacing.

In some embodiments, the depth of the modular filtration units can be increased or decreased to increase or decrease the efficiency in which particles, particularly coarse particles are collected.

Other aspects of the invention will become apparent by consideration of the detailed description and accompanying drawings.

BRIEF DESCRIPTION OF THE DRAWINGS

Referring now to the drawings in which like reference numbers represent corresponding parts throughout.

DETAILED DESCRIPTION

The embodiments disclosed herein relate generally to a HVAC unit in a transport compartment. More particularly, the embodiments relate to an air filtration system and method for a HVAC unit in a transport compartment.

Figure 1A:
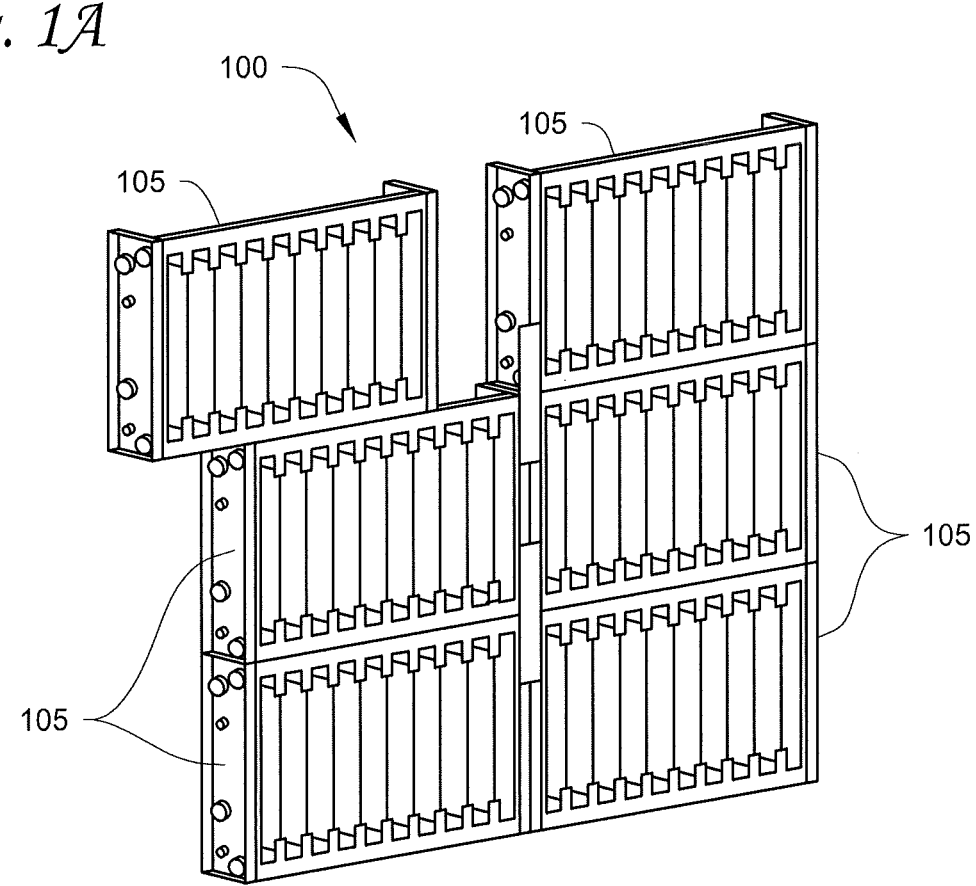
FIGS. 1A-E illustrate different modular configurations of an air filtration system for a HVAC unit in a transport compartment.

FIGS. 1A-E illustrate different modular configurations of an air filtration system 100 for a HVAC unit in a transport compartment. As shown in FIG. 1A, the air filtration system 100 includes a plurality of modular filtration units 105 that are interconnected. Each modular filtration unit 105 can be interconnected to another modular filtration unit 105 that is adjacent, on top of or below the modular filtration unit 105. Thus, the air filtration system 100 can be customized such that the modular filtration units 105 can be interconnected to other modular filtration units 105 to fill the space requirements of the transport compartment and the requirements of the HVAC unit. In some embodiments, only a single modular filtration unit can be used for a HVAC unit in a transport compartment.

Figure 1B:
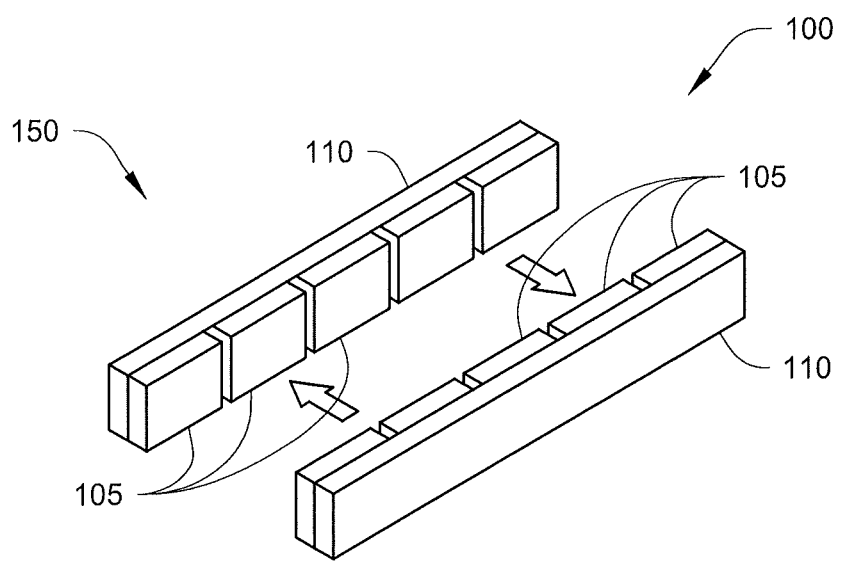

FIG. 1B illustrates the air filtration system 100 configured for a HVAC unit 150 in a bus. The HVAC unit 150 includes opposing evaporators 110. The inside surface of each of the opposing evaporators 110 are lined with interconnected modular filtration units 105 that are located adjacently to each other. The air filtration system 100 shown in FIG. 1B allows mix air to travel from one of the opposing evaporators 110 to the other opposing evaporator 110.

Figure 1C:
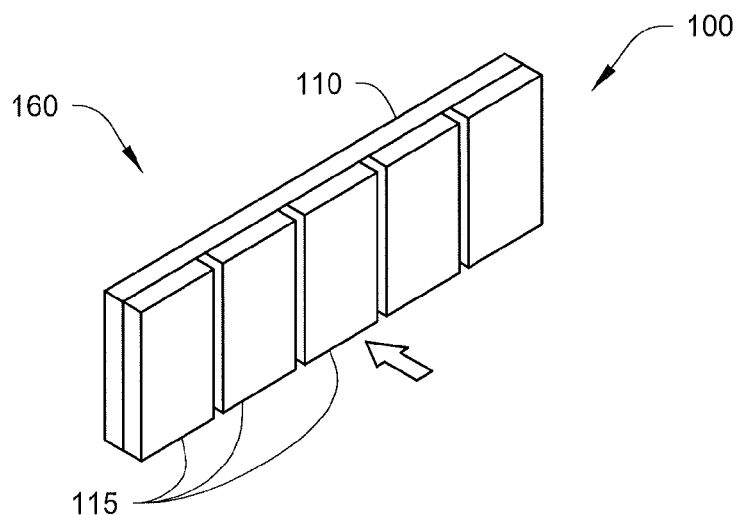

FIG. 1C illustrates the air filtration system 100 configured for a double deck HVAC unit 160 in a bus. The double deck HVAC unit 160 includes a single evaporator 110. The inside surface of the evaporator 110 is lined with interconnected large modular filtration units 115 that are located adjacently to each other. The air filtration system 100 shown in FIG. 1C allows return air to travel towards the large modular filtration units 115 that are lined up in front of the evaporator 110.

Figure 1D:
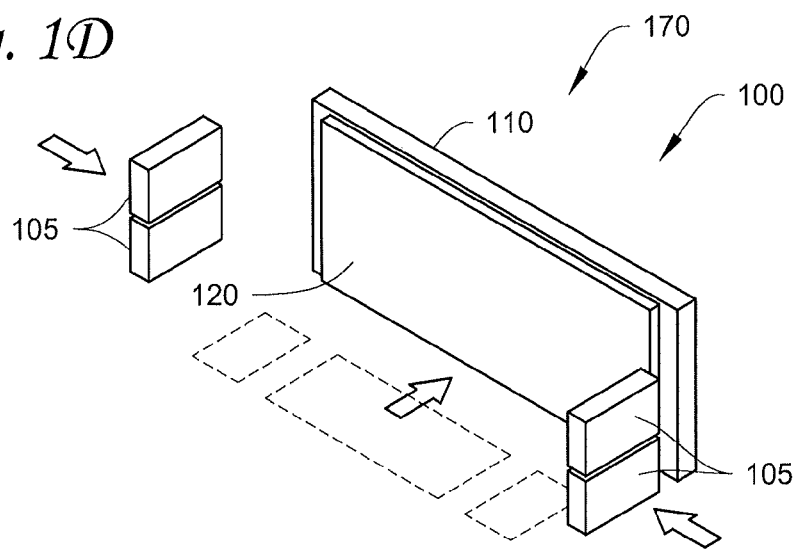

FIG. 1D illustrates the air filtration system 100 configured for a HVAC unit 170 in a rail compartment. The HVAC unit 170 includes an evaporator 110 and a mix filter 120 provided in front of the evaporator 110. The modular filtration units 105 are stacked on top of each other and are arranged at either end of the evaporator 110 and the mix filter 120. The air filtration system 100 shown in FIG. 1D allows mix air to travel towards the mix filter 120 that is provided in front of the evaporator 110, and between the opposing modular filtration units 105. Fresh air is provided from an outside surface of the modular filtration units 105 and return air passes underneath the modular filtration units 105, the evaporator 110 and the mix filter 120.

Figure 1E:
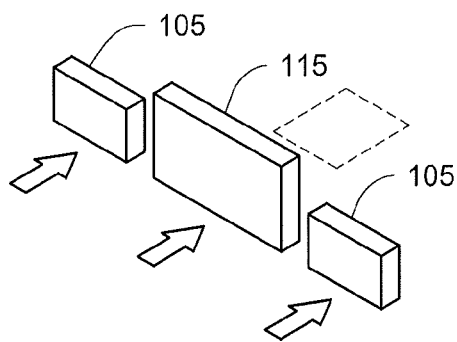

FIG. 1E illustrates the air filtration system 100 configured for a HVAC unit 180 in a rail compartment. The HVAC unit 180 includes the modular filtration units 105 that are spaced on either side of the large modular filtration unit 115. The air filtration system 100 shown in FIG. 1E allows fresh air to travel towards one side of the modular filtration units 105 and the large modular filtration unit 115 with return air provided at an opposing side of the modular filtration units 105 and the large modular filtration unit 115.

Figure 2:
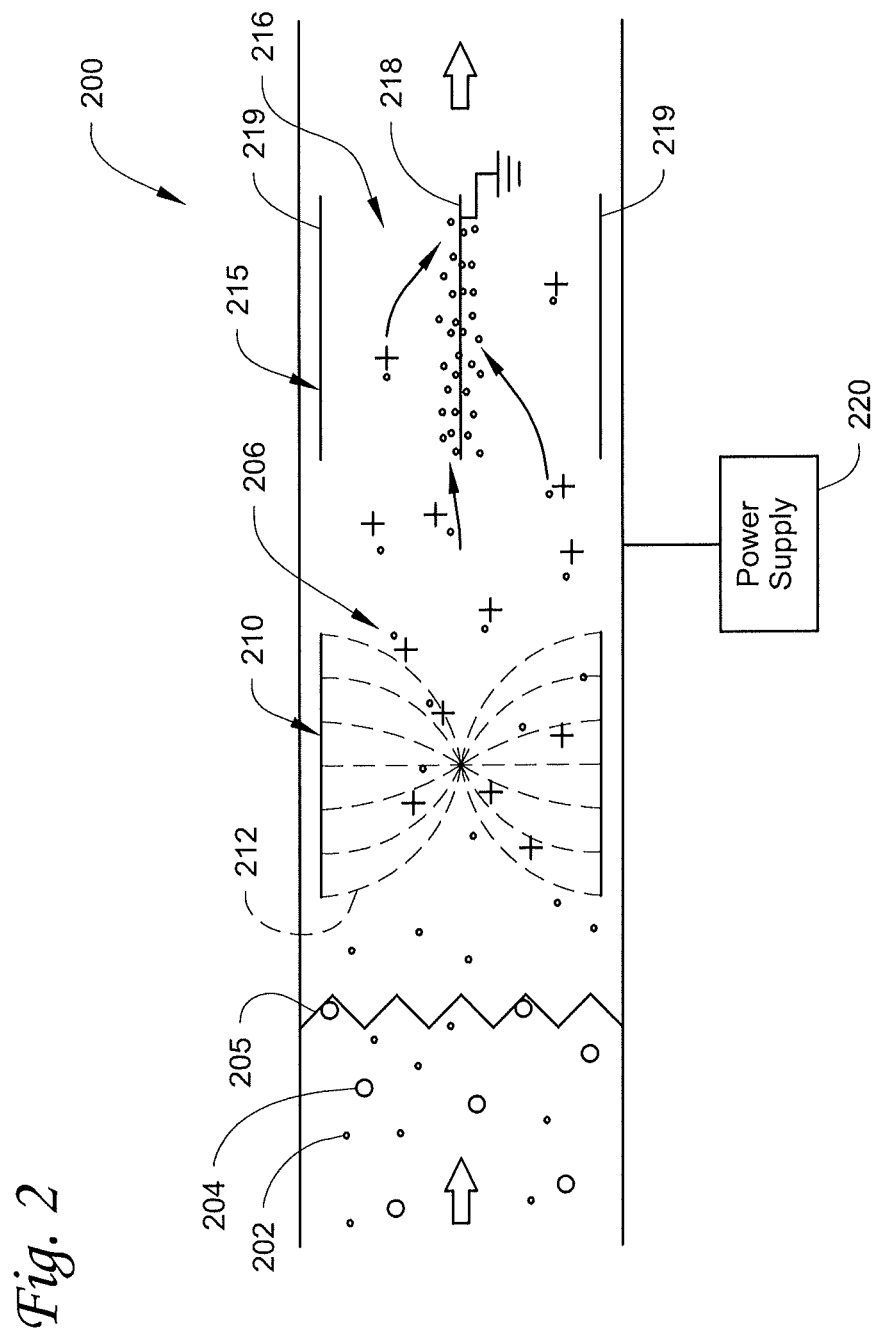
FIG. 2 illustrates how air is filtered to remove particles (e.g., dust, etc.) through a modular filtration unit of an air filtration system for a HVAC unit in a transport compartment, according to one embodiment.

FIG. 2 illustrates how air is filtered to remove particles (e.g., dust, etc.) through a modular filtration unit 200 of an air filtration system for a HVAC unit in a transport compartment, according to one embodiment. The modular filtration unit 200 includes a pre-filter section 205, an ionizing section 210, and a collecting section 215.

Dirty air that contains coarse particles 202 and fine particles 204 enters the modular filtration unit 200 by first passing through the pre-filter section 205. The pre-filter section 205 is configured to capture coarse particles 202 and prevent the coarse particles 202 from passing through the rest of the modular filtration unit 200. Coarse particles 202 refer to particles that are of a sufficient size to cause a short-circuit in other portions of the modular filtration unit 200. In some embodiments, the pre-filter section 205 is a pre-filter mesh with holes that are between ~1 mm to ~10 mm in size so as to protect electrodes within the ionizing section 210 and the collecting section 215 from short-circuiting or otherwise being damaged, and to decrease a potential air flow resistance as air travels through the modular filtration unit 200.

The air then passes through the ionizing section 210, where the air is ionized such that at least a portion, if not all, of the fine particles 204 becomes electrically charged particles 206. The ionizing section 210 includes an electrostatic field 212. The electrostatic field 212 could be created by a wire plate, a pin to edge of a plate, or any other device that causes ionization of air and particles. In some embodiments, a first high-voltage value is provided to a first electrode and a second electrode, that is adjacent the first electrode, is grounded. In some embodiments the electrostatic field 212 is created using a single continuous wire that is intertwined along a cross section of the modular filtration unit 200.

The first high-voltage value and the geometry of the electrodes used to form the electrostatic field 212 are selected to ensure a desired filtration efficiency and prevent a short circuit of the ionizing section 210. The first high-voltage value provided for the electrostatic field 212 can optimized for maximum particle holding capacity, such as, between ~2 kV to ~14 kV. In some embodiments, the first high-voltage value provided for the electrostatic field 212 is preferably between ~6 kV to ~10 kV.

After ionization, the charged particles 206 are drawn by the airstream into the collecting section 215. The collecting section 215 includes a uniform electrostatic field 216 (having a second high-voltage value) and a ground surface plate 218. The uniform electrostatic field 216 is formed using a plate to plate configuration by parallel plates 219. In other embodiments, the uniform electrostatic field 216 can be formed using other configurations.

The second high-voltage value and the configuration used to form the electrostatic field 216 are selected to ensure a desired filtration efficiency and prevent a short circuit of the collecting section 215. In some embodiments, the parallel plates 219 are each provided a second high-voltage value, for example, between ~1 kV to ~10 kV. In some embodiments, the second high-voltage value provided for the electrostatic field 216 is preferably between ~2 kV to ~6 kV.

The uniform electrostatic field 216 causes the charged particles 206 to be attracted to the ground surface plate 218, where they remain captured until they are manually removed from the modular filtration unit 210.

The ionizing section 210 and the collecting section 215 are powered by a power supply 220. In some embodiments, the power supply 220 supplies power from a vehicle (not shown) housing the modular filtration unit 200. The power supply 220 then converts the voltage supplied from the vehicle to the first high-voltage value and supplies the first high-voltage value to the ionizing section 210. The power supply 220 also converts the voltage supplied from the vehicle to the second high-voltage value and supplies the second high-voltage value to the ionizing section 210.

Figure 3A:
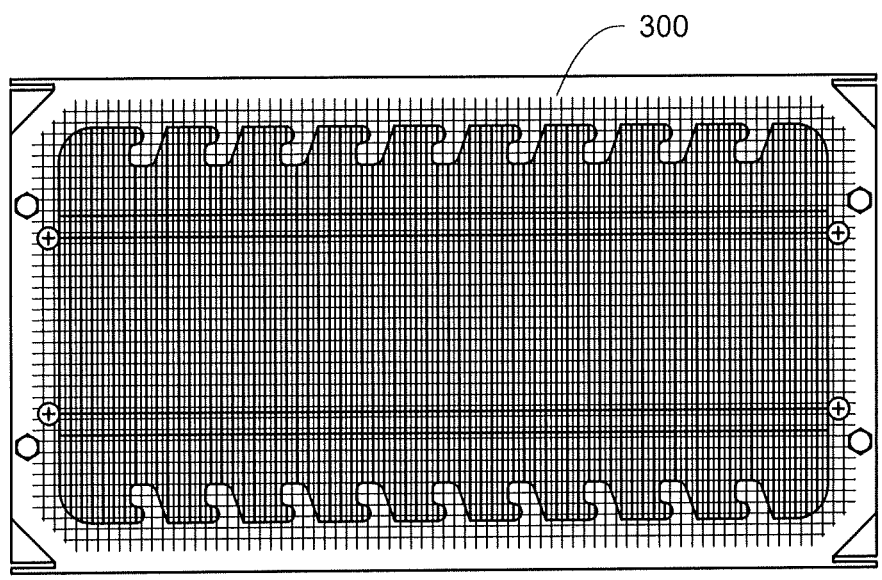
FIGS. 3A-D illustrate different views of a modular filtration unit, according to one embodiment.
Figure 3B:
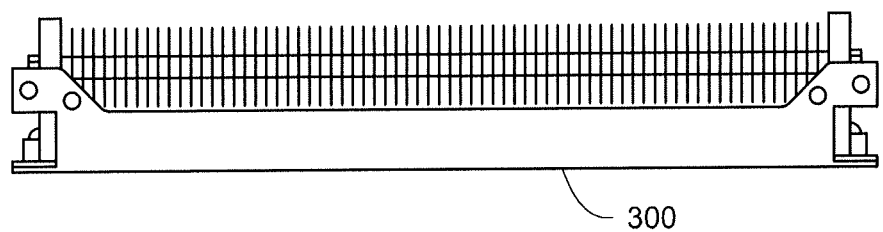
Figure 3C:
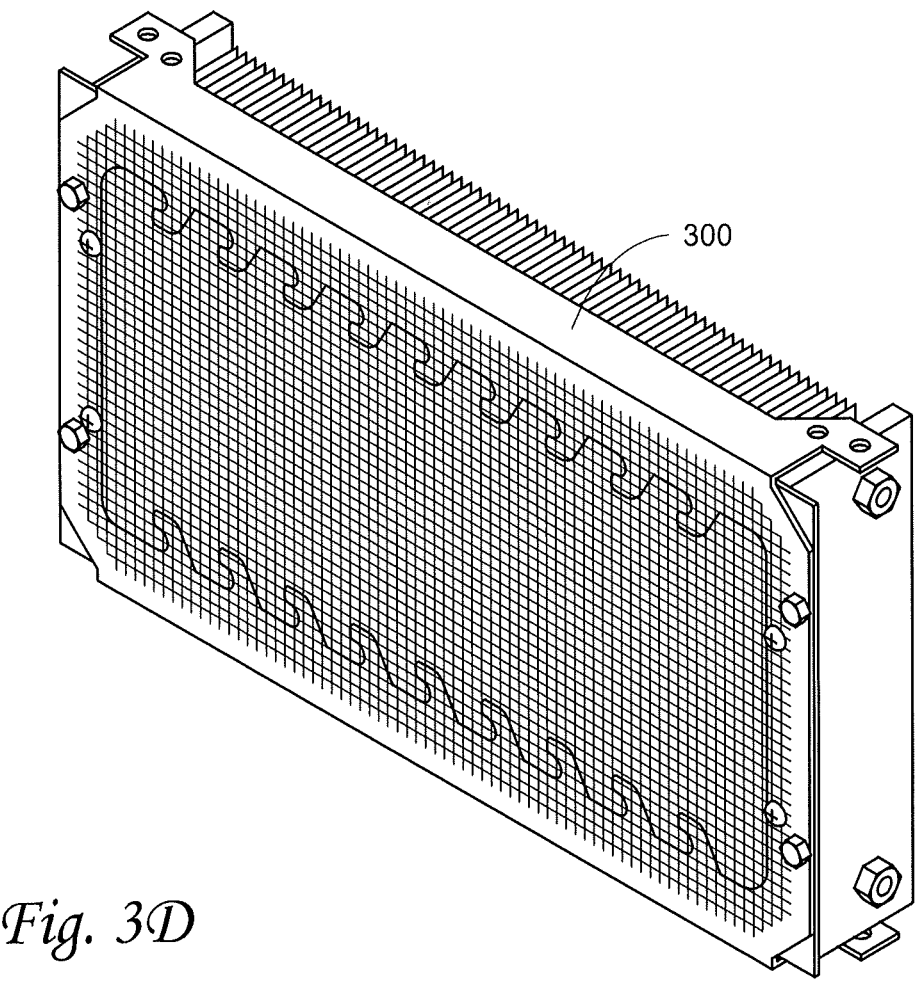
Figure 3D:
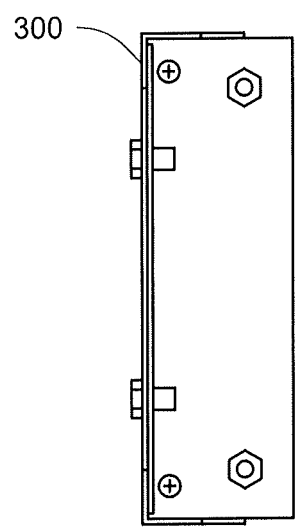

FIGS. 3A-D illustrate different views of a modular filtration unit 300. FIG. 3A is a front view of the modular filtration unit 300. FIG. 3B is a side view of the modular filtration unit 300. FIG. 3C is a perspective view of the modular filtration unit 300. FIG. 3D is an end view of the modular filtration unit 300.

Figure 4A:
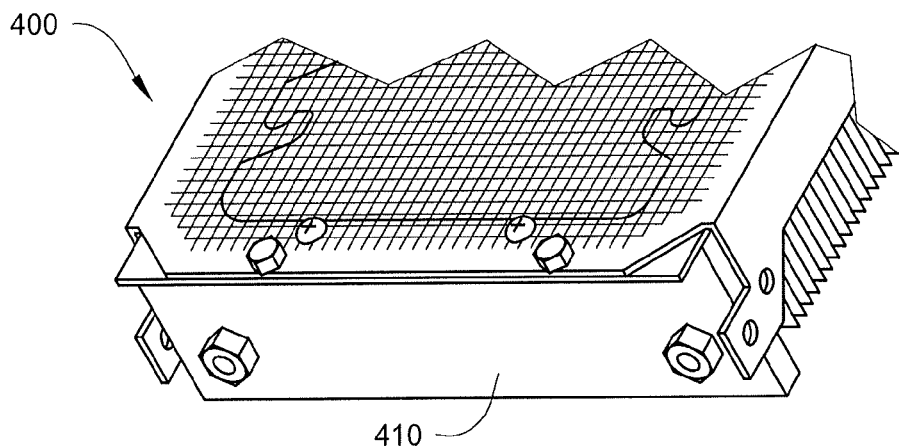
FIGS. 4A-C illustrate different views of a frame structure of a modular filtration unit, according to one embodiment.
Figure 4B:
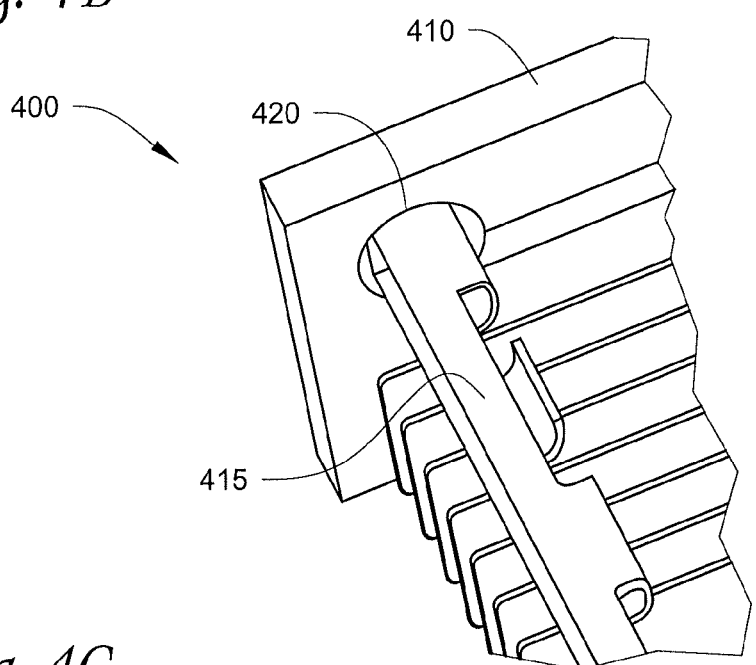
Figure 4C:
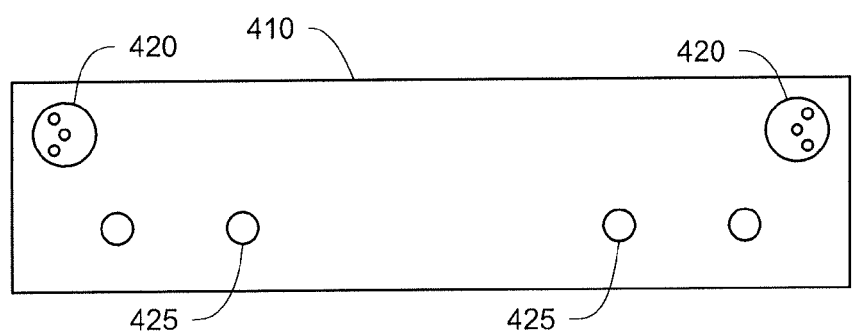

FIGS. 4A-C illustrate different views of a frame structure 410 of a modular filtration unit 400. The frame structure 410 is made of an electrical insulating material to electrically insulate an ionizing section and a collecting section within the modular filtration unit 400 from outside of the modular filtration unit 400. The frame structure 410 in FIGS. 4A-C are made from an electrically insulating plastic that serves as a frame for the modular filtration unit 400 and serves as an insulator. In other embodiments, the frame structure 410 can be made from an electrically insulating metal material.

As shown in FIGS. 4B and 4C, the modular filtration unit 400 also includes supporting bars 415. The frame structure 410 includes cavities 420 that are configured to hold the supporting bars 415 and prevent the supporting bars 415 from penetrating through the frame structure 410. As shown in FIG. 4C, the frame structure 410 also includes cavities 425 that are configured to hold an ionizing wire holder (not shown) of the modular filtration unit 400. This prevents the ionizing wire holder from sparking with other conductive parts of the modular filtration unit 400, an adjacent modular filtration unit (not shown) or an air conditioning unit (not shown).

In some embodiments, an outer side of the frame structure 410 is provided with less conductive material than the material on an inner side of the frame structure. Also, in some embodiments, the frame structure 410 has a smooth design.

Figure 5A:
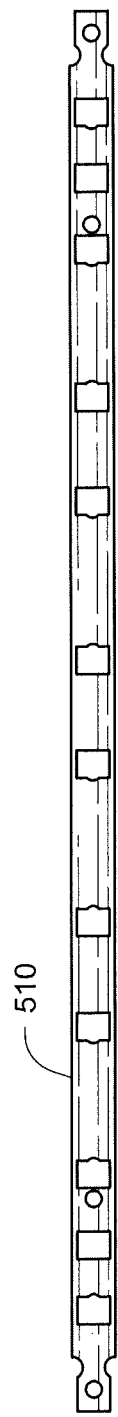
FIGS. 5A-B illustrate components of an ionizing section of a modular filtration unit, according to one embodiment.
Figure 5B:
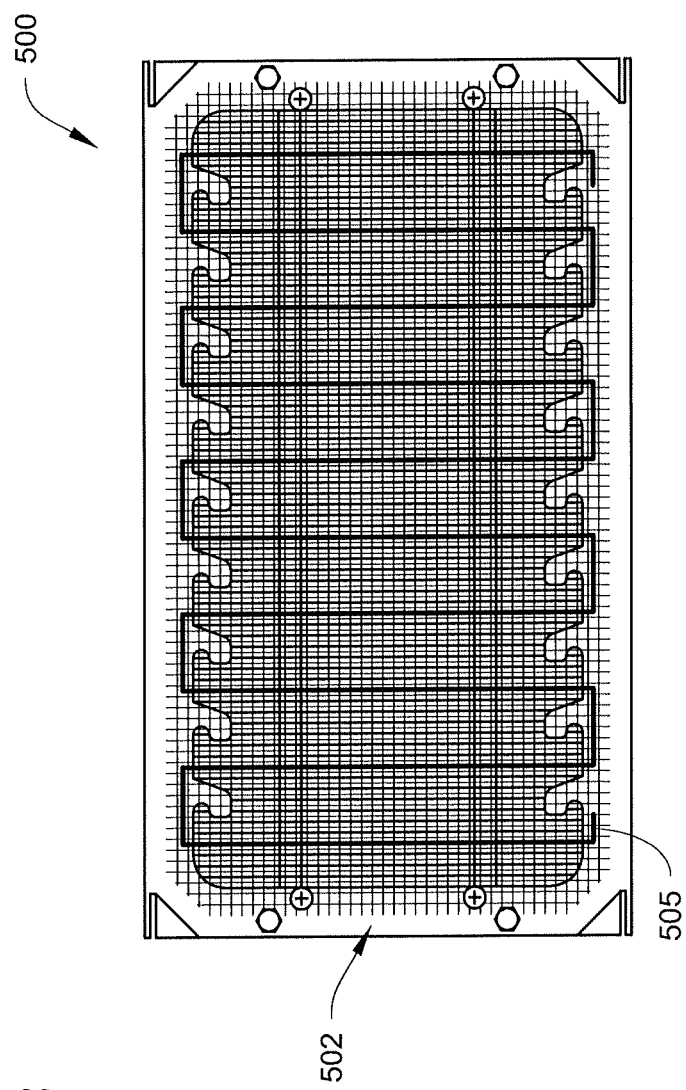

FIGS. 5A-B illustrate components of an ionizing section 502 of a modular filtration unit 500. The modular filtration unit 500 includes a single ionizing wire 505 that is intertwined through the ionizing section 502 (see FIG. 5B) and an ionizing wire holder 510 (see FIG. 5A) for holding the ionizing wire 505 straight along its path. By using a single ionizing wire 505, the size of the modular filtration unit 500 can be reduced by not requiring springs and end holders used for keeping the ionizing wire 505 straight. Thus, the height of the modular filtration unit 500 can be shortened, and the useable cross section of the modular filtration unit 500 can be reduced while still operating efficiently.

Figure 6A:
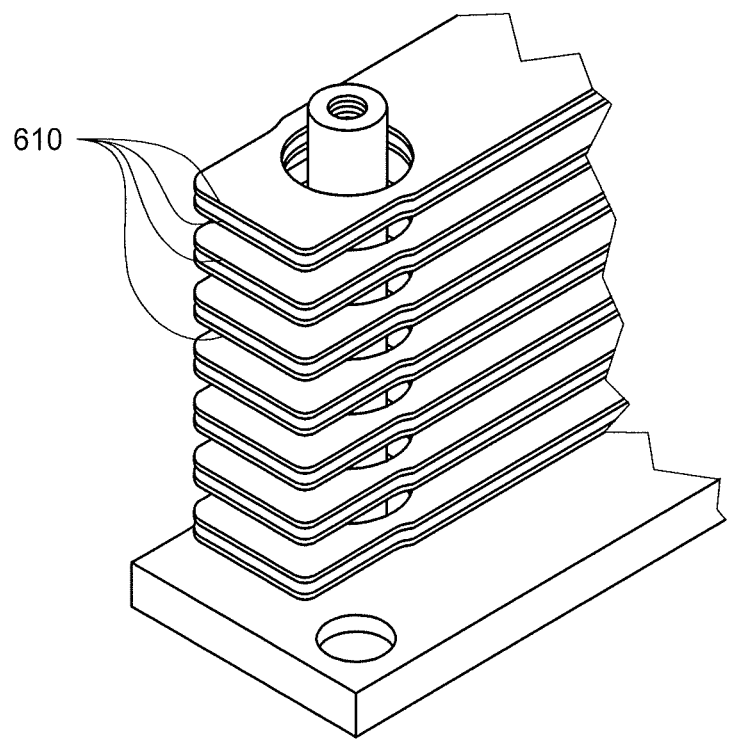
FIGS. 6A-B illustrate conductive components of a modular filtration unit, according to one embodiment.
Figure 6B:
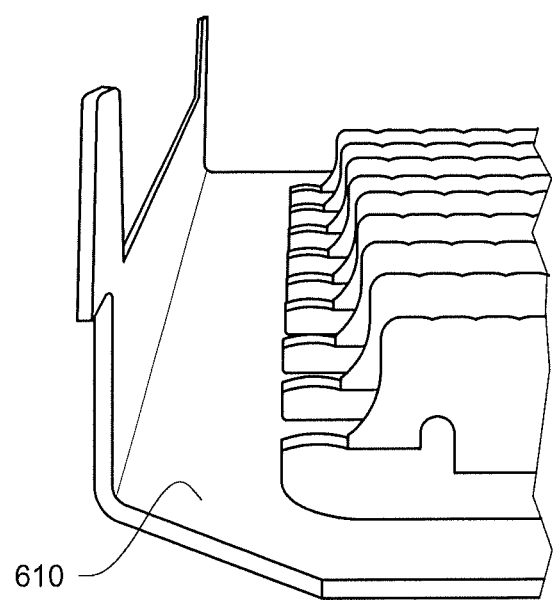

FIGS. 6A-B illustrate conductive components 610, such as a conductive plate in the ionizing section and a ground surface plate of the collecting section, of a modular filtration unit (not shown). The conductive components 610 are plates that are spaced to maintain a minimum distance between electrodes of the modular filtration unit to prevent a short-circuit or damage to the modular filtration unit.

Figure 7:
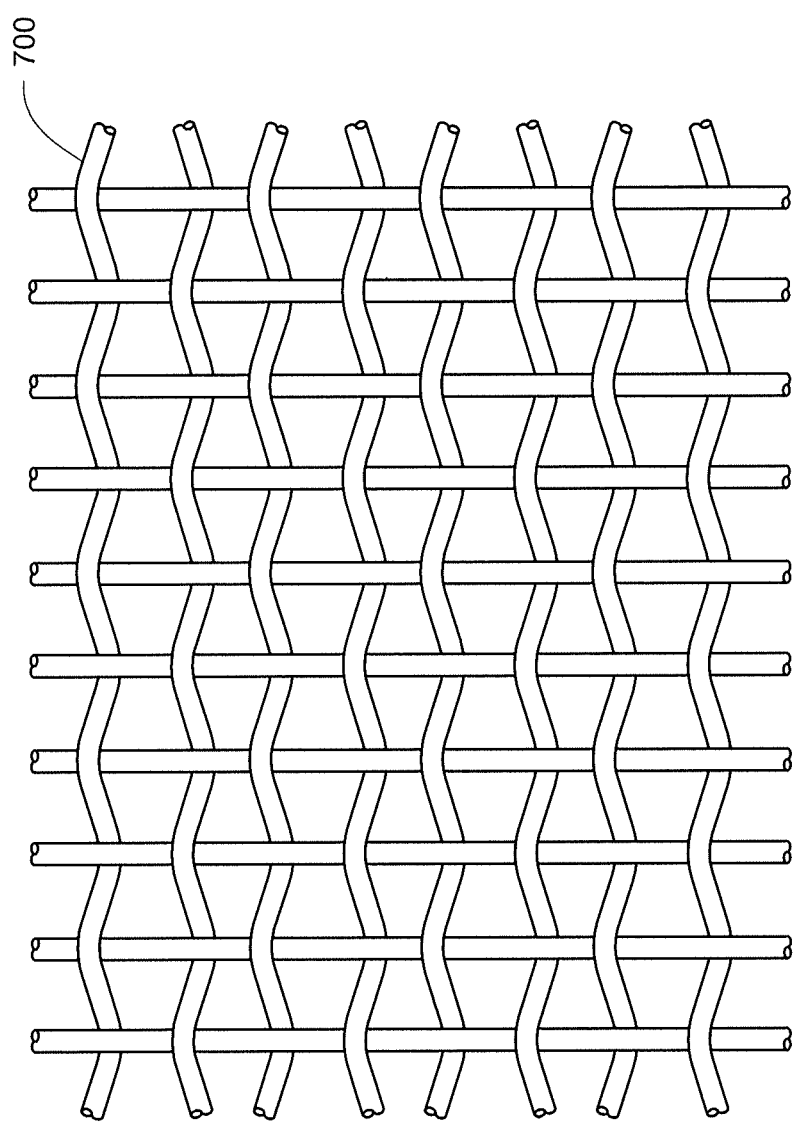
FIG. 7 illustrates a pre-filter mesh used in a pre-filter section of a modular filtration unit, according to one embodiment.

FIG. 7 illustrates a pre-filter mesh 700 used in a pre-filter section of a modular filtration unit (not shown). The holes in the pre-filter mesh 700 are designed to be sized between ~50% to ~100% of the size of the closest spacing between two electrodes within the modular filtration unit. In some embodiments, the pre-filter mesh 700 is a metal fabric with ~2 mm sized holes. If the holes are sized any larger, there is a potential for coarse particles (e.g. conductive splinters) to create a short-circuit between electrodes in the modular filtration unit. If the holes are sized any smaller, the openings in the modular filtration unit can create a pressure drop. While the holes in the pre-filter mesh 700 are square shaped, in other embodiments, the holes in the pre-filter mesh 700 can be, for example, triangular shaped, round, or any other type of shape. In some embodiments, the pre-filter mesh 700 can have a width of ~1 mm to be compact.

Figure 8A:
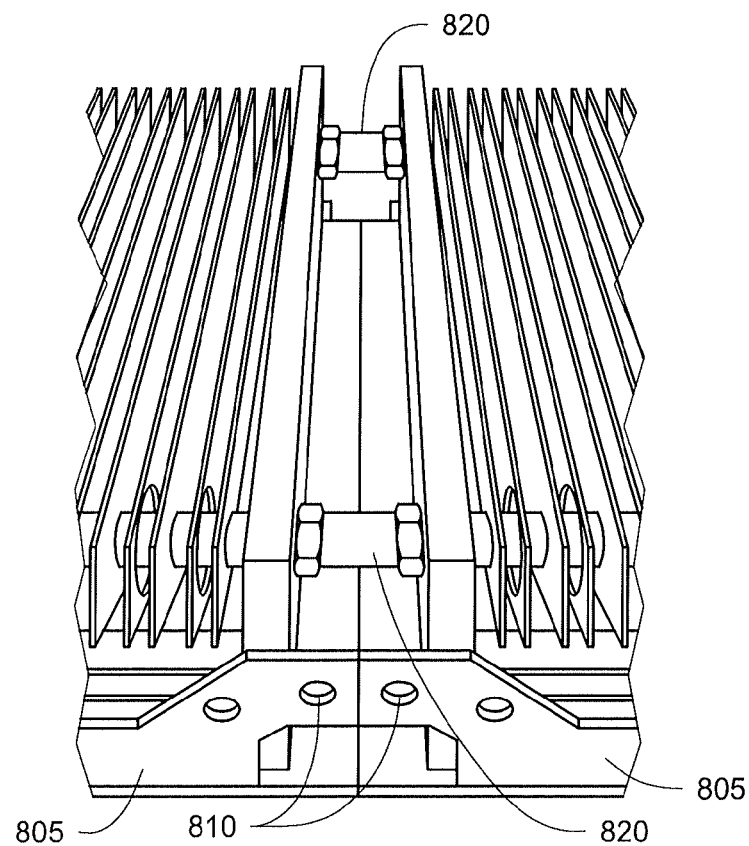
FIGS. 8A-B illustrate the interconnection between two modular filtration units, according to one embodiment.
Figure 8B:
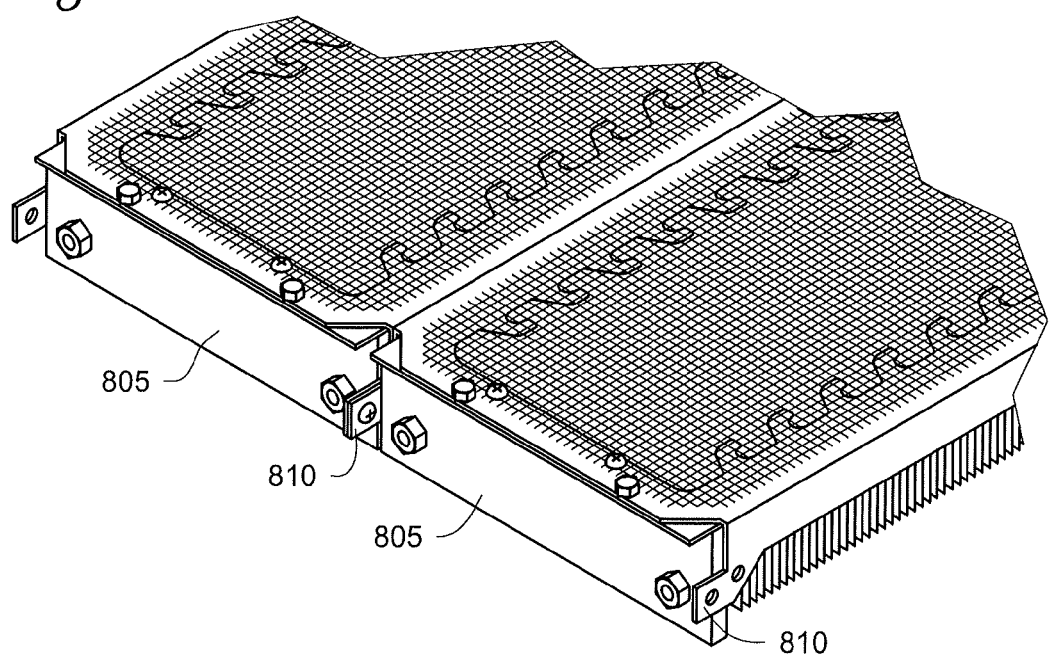

FIGS. 8A-B illustrate the interconnection between two modular filtration units 805, according to one embodiment. Each of the modular filtration units 805 includes a plurality of mounting holes 810 on a front face, a bottom and a top of the modular filtration unit 805. The mounting holes 810 can be used with an attachment mechanism (e.g., screw, nut, bolt, etc.) to interconnect the modular filtration unit 805 to another modular filtration unit 805. The modular filtration units 805 also include electrical connectors 820 that are configured to electrically connect the modular filtration units 805, as opposed to, for example, wires and high-voltage end-fittings. While FIG. 8A shows the electrical connectors 820 applied to two modular filtration units 805 that are adjacently interconnected, in other embodiments, electrical connectors can be applied to two modular filtration units that are stacked on top of each other.

Figure 9:
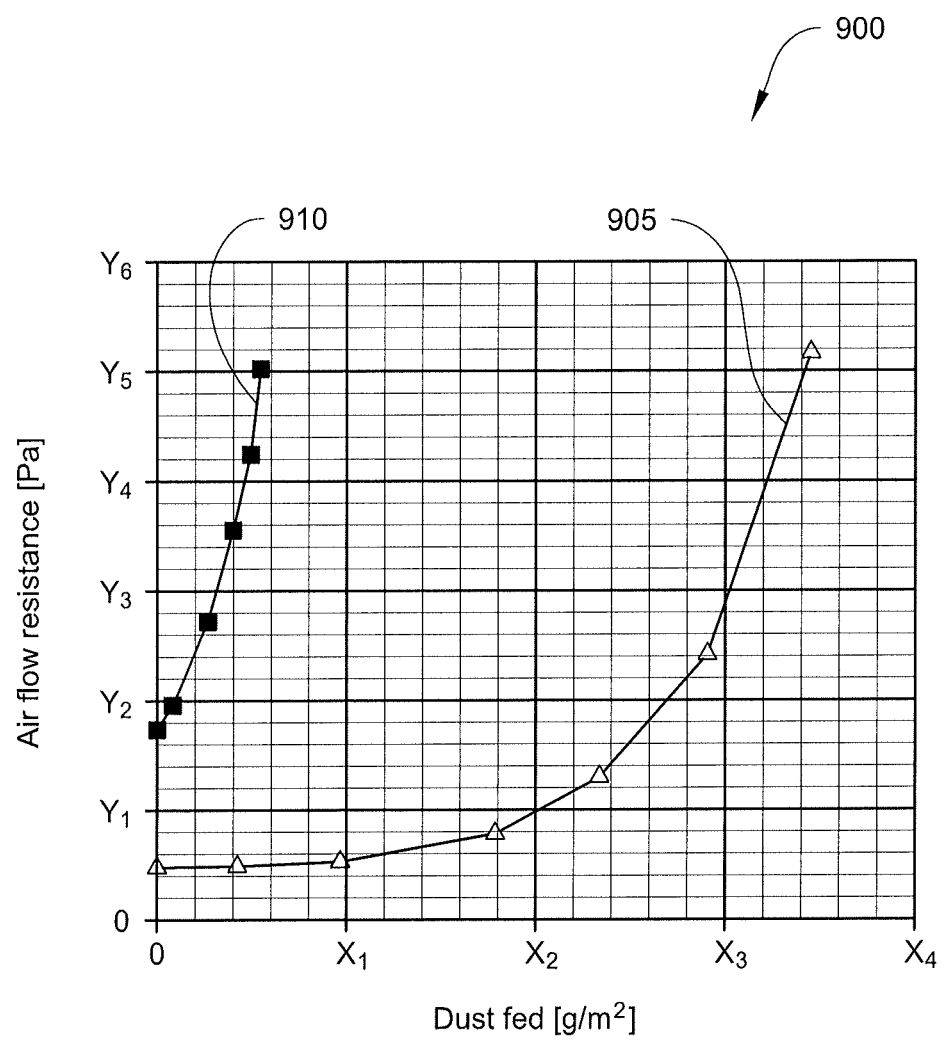
FIG. 9 illustrates a chart comparing a dust holding capacity and an air flow resistance of one embodiment of the modular filtration unit as described herein versus a conventional two inch pleated filter.

FIG. 9 illustrates a chart 900 comparing a dust holding capacity and an air flow resistance of one embodiment of the modular filtration unit 905 as described herein versus a conventional two inch pleated filter 910. As shown in the chart 900, the modular filtration unit 905 as described herein can collect significantly more dust before the air flow resistance increases than the conventional two inch pleated filter 910.

Aspects:

It is noted that any of aspects 1-8, 9-16, 17-23 and 24-28 can be combined.

Aspect 1: An air filtration system for a HVAC unit in a transport compartment comprising:
    a plurality of modular filtration units, each of the plurality of modular filtration units including:
        a pre-filter section configured to capture coarse particles and prevent coarse particles from passing through the modular filtration unit,
        an ionizing section configured to create a first electrostatic field, the ionizing section configured to electrically charge fine particles passing through the ionizing section,
        a collecting section configured to create a second uniform electrostatic field and a ground surface plate, wherein the second uniform electrostatic field is configured to attract the electrically charged fine particles to the ground surface plate and the ground surface plate is configured to capture the electrically charged fine particles, and
        a plurality of mounting holes on a front face, a bottom and a top of the modular filtration unit, wherein the plurality of mounting holes are configured to interconnect the modular filtration unit to another of the plurality of modular filtration units adjacent to the modular filtration unit and/or on top of the modular filtration unit;
    wherein each of the plurality of modular filtration units is interconnected to another of the plurality of modular filtration units.

Aspect 2. The air filtration system of aspect 1, wherein the pre-filter section includes a pre-filter mesh with a plurality of holes, wherein the plurality of holes have a size configured to capture coarse particles of a sufficient size to cause a short-circuit in other portions of the modular filtration unit.

Aspect 3. The air filtration system of any of aspects 1-2, wherein the first electrostatic field has a first high-voltage value between ~2 kV to ~14 kV for electrically charging fine particles passing through the electrostatic field.

Aspect 4. The air filtration system of any of aspects 1-3, wherein the second uniform electrostatic field has a second high-voltage value between ~1 kV to ~10 kV for attracting the electrically charged fine particles to the ground surface plate.

Aspect 5. The air filtration system of any of aspects 1-4, wherein each of the plurality of modular filtration units also includes a frame structure having an electrical insulating material configured to electrically insulate the ionizing section and the collecting section within the modular filtration unit from outside the modular filtration unit.

Aspect 6. The air filtration system of aspect 5, wherein each of the plurality of modular filtration units also includes a plurality of supporting bars, and
    wherein the frame structure includes a plurality of cavities configured to hold the supporting bars and prevent the plurality of supporting bars from penetrating through the frame modular filtration unit.

Aspect 7. The air filtration system of any of aspects 1-6, wherein the ionizing section includes a single continuous ionizing wire intertwined along a cross section of the modular filtration unit, wherein the single continuous ionizing wire is configured to create the first electrostatic field.

Aspect 8. The air filtration system of any of aspects 1-7, wherein each of the plurality of modular filtration units also includes an electrical connector configured to electrically connect the modular filtration unit to another of the plurality of modular filtration units.

Aspect 9. A modular filtration unit for an air filtration system of a transport compartment comprising:

a pre-filter section configured to capture coarse particles and prevent coarse particles from passing through the modular filtration unit;

an ionizing section configured to create a first electrostatic field, the ionizing section configured to electrically charge fine particles passing through the ionizing section;

a collecting section configured to create a second uniform electrostatic field and a ground surface plate, wherein the second uniform electrostatic field is configured to attract the electrically charged fine particles to the ground surface plate and the ground surface plate is configured to capture the electrically charged fine particles; and a plurality of mounting holes on a front face, a bottom and a top of the modular filtration unit, wherein the plurality of mounting holes are configured to interconnect the modular filtration unit to a second modular filtration unit adjacent to the modular filtration unit and/or on top of the modular filtration unit.

Aspect 10. The modular filtration unit of aspect 9, further comprising an electrical connector configured to electrically connect the modular filtration unit to the second modular filtration unit.

Aspect 11. The modular filtration unit of any of aspects 9-10, wherein the pre-filter section includes a pre-filter mesh with a plurality of holes, wherein the plurality of holes have a size configured to capture coarse particles of a sufficient size to cause a short-circuit in other portions of the modular filtration unit.

Aspect 12. The modular filtration unit of any of aspects 9-11, wherein the first electrostatic field has a first high-voltage value between ~2 kV to ~14 kV for electrically charging fine particles passing through the electrostatic field.

Aspect 13. The modular filtration unit of any of aspects 9-12, wherein the second uniform electrostatic field has a second high-voltage value between ~1 kV to ~10 kV for attracting the electrically charged fine particles to the ground surface plate.

Aspect 14. The modular filtration unit of any of aspects 9-13, further comprising a frame structure having an electrical insulating material configured to electrically insulate the ionizing section and the collecting section within the modular filtration unit from outside the modular filtration unit.

Aspect 15. The modular filtration unit aspect 14, further comprising a plurality of supporting bars, and wherein the frame structure includes a plurality of cavities configured to hold the supporting bars and prevent the plurality of supporting bars from penetrating through the frame modular filtration unit.

Aspect 16. The modular filtration unit of any of aspects 9-15, wherein the ionizing section includes a single continuous ionizing wire intertwined along a cross section of the modular filtration unit, wherein the single continuous ionizing wire is configured to create the first electrostatic field.

Aspect 17. A modular filtration unit for an air filtration system of a transport compartment comprising:

a pre-filter section configured to capture coarse particles and prevent coarse particles from passing through the modular filtration unit;

an ionizing section configured to create a first electrostatic field, the ionizing section configured to electrically charge fine particles passing through the ionizing section;

a collecting section configured to create a second uniform electrostatic field and a ground surface plate, wherein the second uniform electrostatic field is configured to attract the electrically charged fine particles to the ground surface plate and the ground surface plate is configured to capture the electrically charged fine particles; and a frame structure having an electrical insulating material configured to electrically insulate the ionizing section and the collecting section within the modular filtration unit from outside the modular filtration unit.

Aspect 18. The modular filtration unit of aspect 17, further comprising an electrical connector configured to electrically connect the modular filtration unit to the second modular filtration unit.

Aspect 19. The modular filtration unit of any of aspects 17-18, wherein the pre-filter section includes a pre-filter mesh with a plurality of holes, wherein the plurality of holes have a size configured to capture coarse particles of a sufficient size to cause a short-circuit in other portions of the modular filtration unit.

Aspect 20. The modular filtration unit of any of aspects 17-19, wherein the first electrostatic field has a first high-voltage value between ~2 kV to ~14 kV for electrically charging fine particles passing through the electrostatic field.

Aspect 21. The modular filtration unit of any of aspects 17-20, wherein the second uniform electrostatic field has a second high-voltage value between ~1 kV to ~10 kV for attracting the electrically charged fine particles to the ground surface plate.

Aspect 22. The modular filtration unit of any of aspects 17-21, further comprising a plurality of supporting bars, and wherein the frame structure includes a plurality of cavities configured to hold the supporting bars and prevent the plurality of supporting bars from penetrating through the frame modular filtration unit.

Aspect 23. The modular filtration unit of any of aspects 17-22, wherein the ionizing section includes a single continuous ionizing wire intertwined along a cross section of the modular filtration unit, wherein the single continuous ionizing wire is configured to create the first electrostatic field.

Aspect 24. A modular filtration unit for an air filtration system of a transport compartment comprising:

a pre-filter section configured to capture coarse particles and prevent coarse particles from passing through the modular filtration unit;

an ionizing section configured to create a first electrostatic field, the ionizing section configured to electrically charge fine particles passing through the ionizing section; and a collecting section configured to create a second uniform electrostatic field and a ground surface plate, wherein the second uniform electrostatic field is configured to attract the electrically charged fine particles to the ground surface plate and the ground surface plate is configured to capture the electrically charged fine particles, wherein the ionizing section includes a single continuous ionizing wire intertwined along a cross section of the modular filtration unit, wherein the single continuous ionizing wire is configured to create the first electrostatic field.

Aspect 25. The modular filtration unit of aspect 24, further comprising an electrical connector configured to electrically connect the modular filtration unit to the second modular filtration unit.

Aspect 26. The modular filtration unit of any of aspects 24-25, wherein the pre-filter section includes a pre-filter mesh with a plurality of holes, wherein the plurality of holes have a size configured to capture coarse particles of a sufficient size to cause a short-circuit in other portions of the modular filtration unit.

Aspect 27. The modular filtration unit of any of aspects 24-26, wherein the first electrostatic field has a first high-voltage value between ~2 kV to ~14 kV for electrically charging fine particles passing through the electrostatic field.

Aspect 28. The modular filtration unit of any of aspects 24-27, wherein the second uniform electrostatic field has a second high-voltage value between ~1 kV to ~10 kV for attracting the electrically charged fine particles to the ground surface plate.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

The invention claimed is:

1. An air filtration system for a HVAC unit in a transport compartment comprising:
   a plurality of modular filtration units, each of the plurality of modular filtration units including:
      a pre-filter section configured to capture coarse particles and prevent coarse particles from passing through the modular filtration unit,
      an ionizing section configured to create a first electrostatic field, the ionizing section configured to electrically charge fine particles passing through the ionizing section,
      a collecting section configured to create a second uniform electrostatic field and a ground surface plate, wherein the second uniform electrostatic field is configured to attract the electrically charged fine particles to the ground surface plate and the ground surface plate is configured to capture the electrically charged fine particles,
      a plurality of mounting holes on a front face, a bottom and a top of the modular filtration unit, wherein the plurality of mounting holes are configured to interconnect the modular filtration unit to another of the plurality of modular filtration units adjacent to the modular filtration unit and/or on top of the modular filtration unit, and
      an ionizing wire holder that holds an ionizing wire straight along a path of the ionizing wire;
   wherein each of the plurality of modular filtration units is interconnected to another of the plurality of modular filtration units, and
   wherein each of the plurality of modular filtration units includes a frame structure and a plurality of supporting bars,
   wherein the frame structure includes a plurality of first cavities and a plurality of second cavities, the plurality of first cavities configured to hold the supporting bars and prevent the plurality of supporting bars from penetrating through the frame modular filtration unit, and the plurality of second cavities configured to hold the ionizing wire holder.

2. The air filtration system of claim 1, wherein the pre-filter section includes a pre-filter mesh with a plurality of holes, wherein the plurality of holes have a size configured to capture coarse particles of a sufficient size to cause a short-circuit in other portions of the modular filtration unit.

3. The air filtration system of claim 1, wherein the first electrostatic field has a first high-voltage value between ~2 kV to ~14 kV for electrically charging fine particles passing through the electrostatic field.

4. The air filtration system of claim 1, wherein the second uniform electrostatic field has a second high-voltage value between ~1 kV to ~10 kV for attracting the electrically charged fine particles to the ground surface plate.

5. The air filtration system of claim 1, wherein the frame structure for each of the plurality of modular filtration units has an electrical insulating material configured to electrically insulate the ionizing section and the collecting section within the modular filtration unit from outside the modular filtration unit.

6. The air filtration system of claim 1, wherein the ionizing section includes the single continuous ionizing wire intertwined along a cross section of the modular filtration unit, wherein the single continuous ionizing wire is configured to create the first electrostatic field.

7. The air filtration system of claim 1, wherein each of the plurality of modular filtration units also includes an electrical connector configured to electrically connect the modular filtration unit to another of the plurality of modular filtration units.

8. A modular filtration unit for an air filtration system of a transport compartment comprising:
   a pre-filter section configured to capture coarse particles and prevent coarse particles from passing through the modular filtration unit;
   an ionizing section configured to create a first electrostatic field, the ionizing section configured to electrically charge fine particles passing through the ionizing section;
   a collecting section configured to create a second uniform electrostatic field and a ground surface plate, wherein the second uniform electrostatic field is configured to attract the electrically charged fine particles to the ground surface plate and the ground surface plate is configured to capture the electrically charged fine particles;
   a plurality of mounting holes on a front face, a bottom and a top of the modular filtration unit, wherein the plurality of mounting holes are configured to interconnect the modular filtration unit to a second modular filtration unit adjacent to the modular filtration unit and/or on top of the modular filtration unit;
   an ionizing wire holder that holds an ionizing wire straight along a path of the ionizing wire; and
   a frame structure and a plurality of supporting bars,
   wherein the frame structure includes a plurality of first cavities and a plurality of second cavities, the plurality of first cavities configured to hold the supporting bars and prevent the plurality of supporting bars from penetrating through the frame modular filtration unit, and the plurality of second cavities configured to hold the ionizing wire holder.

9. The modular filtration unit of claim 8, further comprising an electrical connector configured to electrically connect the modular filtration unit to the second modular filtration unit.

10. The modular filtration unit of any of claim 8, wherein the pre-filter section includes a pre-filter mesh with a plurality of holes, wherein the plurality of holes have a size configured to capture coarse particles of a sufficient size to cause a short-circuit in other portions of the modular filtration unit.

11. The modular filtration unit of any of claim 8, wherein the frame structure has an electrical insulating material configured to electrically insulate the ionizing section and the collecting section within the modular filtration unit from outside the modular filtration unit.

12. The modular filtration unit of claim 8, wherein the ionizing section includes a single continuous ionizing wire intertwined along a cross section of the modular filtration unit, wherein the single continuous ionizing wire is configured to create the first electrostatic field.

13. A modular filtration unit for an air filtration system of a transport compartment comprising:
- a pre-filter section configured to capture coarse particles and prevent coarse particles from passing through the modular filtration unit;
- an ionizing section configured to create a first electrostatic field, the ionizing section configured to electrically charge fine particles passing through the ionizing section;
- a collecting section configured to create a second uniform electrostatic field and a ground surface plate, wherein the second uniform electrostatic field is configured to attract the electrically charged fine particles to the ground surface plate and the ground surface plate is configured to capture the electrically charged fine particles;
- a frame structure having an electrical insulating material configured to electrically insulate the ionizing section and the collecting section within the modular filtration unit from outside the modular filtration unit;
- an ionizing wire holder that holds an ionizing wire straight along a path of the ionizing wire; and
- a plurality of supporting bars,
- wherein the frame structure includes a plurality of first cavities and a plurality of second cavities, the plurality of first cavities configured to hold the supporting bars and prevent the plurality of supporting bars from penetrating through the frame modular filtration unit, and the plurality of second cavities configured to hold the ionizing wire holder.

14. The modular filtration unit of claim 13, wherein the pre-filter section includes a pre-filter mesh with a plurality of holes, wherein the plurality of holes have a size configured to capture coarse particles of a sufficient size to cause a short-circuit in other portions of the modular filtration unit.

15. The modular filtration unit of claim 13, wherein the ionizing section includes a single continuous ionizing wire intertwined along a cross section of the modular filtration unit, wherein the single continuous ionizing wire is configured to create the first electrostatic field.

16. A modular filtration unit for an air filtration system of a transport compartment comprising:
- a pre-filter section configured to capture coarse particles and prevent coarse particles from passing through the modular filtration unit;
- an ionizing section configured to create a first electrostatic field, the ionizing section configured to electrically charge fine particles passing through the ionizing section;
- a collecting section configured to create a second uniform electrostatic field and a ground surface plate, wherein the second uniform electrostatic field is configured to attract the electrically charged fine particles to the ground surface plate and the ground surface plate is configured to capture the electrically charged fine particles;
- an ionizing wire holder that holds an ionizing wire straight along a path of the ionizing wire; and
- a frame structure and a plurality of supporting bars,
- wherein the frame structure includes a plurality of first cavities and a plurality of second cavities, the plurality of first cavities configured to hold the supporting bars and prevent the plurality of supporting bars from penetrating through the frame modular filtration unit, and the plurality of second cavities configured to hold the ionizing wire holder,
- wherein the ionizing section includes a single continuous ionizing wire intertwined along a cross section of the modular filtration unit, wherein the single continuous ionizing wire is configured to create the first electrostatic field.

17. The modular filtration unit of claim 16, wherein the pre-filter section includes a pre-filter mesh with a plurality of holes, wherein the plurality of holes have a size configured to capture coarse particles of a sufficient size to cause a short-circuit in other portions of the modular filtration unit.

18. The air filtration system of claim 1, wherein the ionizing wire holder is generally rectangular shaped and includes a first end and a second end,
- wherein the ionizing wire holder includes a first protrusion extending from the first end and a second protrusion extending from the second end, and
- wherein the ionizing wire holder includes a plurality of openings.

19. The air filtration system of claim 18, wherein each of the first protrusion and the second protrusion of the ionizing wire holder is configured to fit into one of the plurality of second cavities, and
- wherein each of the plurality of openings of the ionizing wire holder is configured to allow the ionizing wire to pass therethrough.

* * * * *